United States Patent Office 2,807,617
Patented Sept. 24, 1957

2,807,617
ACYLPIPERAZINES AND METHODS OF PREPARING THE SAME

Harry P. Dalalian, Rutherford, N. J., and Samuel Kushner, Nanuet, N. Y., assignors to American Cyanamid Company, New York, N. Y., a corporation of Maine No Drawing. Application May 11, 1955,
Serial No. 507,741

13 Claims. (Cl. 260—268)

This invention relates to new organic compounds. More particularly, the invention relates to substituted haloacetylpiperazines and methods of preparing the same.

The disease anclyostomiasis, commonly known as hookworm, is prevalent in warm countries, particularly where plenty of shade and rainfall and a constant wet soil are present. The four principal species of hookworm are all nematodes of the family ancylostomadidae, such as Ancylostoma duodenale, Ancylostoma canium, Ancylostoma braziliensis, and Necator americanus. The disease is usually contracted through the skin of the animal and gaining the capillaries, ascends the bronchial tree and descends the digestive system. The disease is quite prevalent in the southern part of the United States and is often a public health problem. It thrives particularly where poverty and ill-balanced diet is prevalent. In the past it has been treated with compounds such as tetrachlorethylene. This compound, while reasonably effective, causes nausea and drowsiness. Another compound commonly used is hexylresorcinol. While this compound is also somewhat effective, it is irritating to the mucous membranes and expensive. Where large scale treatment of the population is involved the cost is prohibitive.

In the past the treatment of man or animal for hookworm infection was begun with a fast, followed by dosing with an anthelmintic, such as 2-naphthyl thymol, oil of chenopodium, hexylresorcinol, tetrachlorethylene, etc. The toxic anthelmintics along with the hookworms must be removed from the animal's system through the use of purgatives, whereas the compounds of the present invention can be given orally without fasting or the use of purgatives and still produce substantially complete removal of hookworm infection.

Another advantage of the present compounds is the fact that the compounds can be combined with animal feed and given at certain intervals to produce the desired result.

A still further advantage of the present compounds is the fact that they can be made cheaply from readily available raw material.

The highly effective and relatively cheap compounds of the present invention have the following structure:

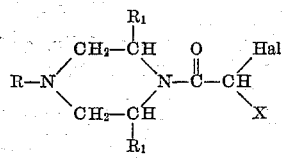

in which R is an aryl radical such as phenyl, halophenyl, alkylphenyl, dialkylphenyl or heterocyclic radical such as pyridyl, thiazolyl, pyrimidyl or pyrazinyl. $R_1$ is a lower alkyl radical or hydrogen, Hal is halogen and X is hydrogen or halogen and hydrohalide salts thereof. The present compounds are generally crystalline solids slightly soluble in the usual organic solvents and relatively insoluble in water.

The compounds of the present invention are prepared by reacting an N-substituted piperazine with a mono- or dihaloacetyl chloride. The reaction can be carried out within the range of −5° C. to 40° C. However, the preferred range is 0° C. to 10° C. The reaction is usually carried out in a solvent such as water, ether, petroleum ether, acetone, benzene, ethyl acetate and the like.

The following Table I summarizes the results obtained in treating six dogs infested with hookworm.

TABLE I
4-dichloroacetyl-1-phenylpiperazine

| Dog number | Stool count, ova per ml. | | Number of adult hookworms found at necropsy | | |
|---|---|---|---|---|---|
| | Before treatment | After treatment | Males | Females | Total |
| X986 (1) | 7,200 | 0 | 1 | 2 | 3 |
| X989 (2) | 11,500 | 0 | 0 | 5 | 5 |
| X990 (3) | 9,100 | 0 | 1 | 10 | 11 |
| Z38 (4) | 4,200 | 1,600 | 16 | 56 | 72 |
| X998 (5) | 4,700 | 100 | 1 | 3 | 4 |
| Z2 (6) | 19,800 | 6,300 | 72 | 257 | 329 |

Dogs 1, 2, and 3 received 50 mgm. per kgm. twice a day for 5 days and dogs 4, 5, and 6 received 25 mgm. per kgm. twice a day for 5 days.

When dogs are treated with an inactive compound in the same manner as above, the results are summarized in Table II.

TABLE II

| Dog number | Stool count, ova per ml. | | Number of adult hookworms found at necropsy | | |
|---|---|---|---|---|---|
| | Before treatment | After treatment | Males | Females | Total |
| X964 (7) | 2,800 | 10,800 | 158 | 246 | 404 |
| X937 (8) | 3,000 | 3,700 | 24 | 34 | 58 |

The summarized results above show the high activity of present compounds over the results of an inactive compound. The above compounds can be made into tablets, capsules, pills or other pharmaceutical types of medication by combining them with suitable carriers. The compositions can also be combined with animal feed and a definite portion of this feed given as a continuous course of treatment or at regular intervals for a short period of time, as shown in the examples hereinafter. For example, in the treatment of hookworm in dogs, it has been found that these active compounds may be mixed with prepared dog food in the proper proportions to give excellent results.

The following examples illustrate in detail the preparation of the dichloracetylpiperazine of the present invention.

EXAMPLE 1

To a stirred solution of 1.5 gms. of 1-phenylpiperazine dissolved in about 50 ml. of dry ether was slowly added 2 gms. of dichloroacetyl chloride dissolved in 25 ml. of dry ether. A white product precipitated out. After the addition of dichloroacetyl chloride was completed, the white product was filtered off, washed with dry ether and dried. The yield of 4-dichloroacetyl-1-phenylpiperazine is 2.7 gms. Two crystallizations from dry ether gave a melting point of 129–130° C.

EXAMPLE 2

To a stirred solution of 39.2 gms. (0.2 mole) of 1-(4-chlorophenyl) piperazine dissolved in 500 ml. of dry benzene was added dropwise 16.2 gms. (0.1 mole) of dichloroacetyl chloride. A white product came out. After the addition was completed, the stirring was continued for about 15 minutes longer. The product was separated by filtration and washed with benzene. The crude white product was slurried in 300 ml. of warm acetone which separated the desired product from the 1-(4-chlorophenyl) piperazine hydrochloride salt which is insoluble. This acetone extraction was repeated several more times and the combined acetone solution was dried and concentrated down, cooled and filtered off the white product. A yield of 27 grams of 1-(4-chlorophenyl)-4-dichloroacetylpiperazine, melting point 148–150° C., was obtained. Crystallization from acetone and subsequently from hot alcohol gave a melting point of 152–153° C.

EXAMPLE 3

To a stirred solution of 38 gms. (0.2 mole) of 1-(2,6-dimethylphenyl) piperazine dissolved in 500 ml. of dry ether between 5–10° C. was added dropwise 16.2 grams (0.1 mole) of dichloroacetyl chloride dissolved in 100 ml. of dry ether. A white precipitate came out. After the addition was completed, the stirring continued about 15 minutes longer. The white product was filtered off and washed with dry ether. The white product was slurried several times in 300 ml. portion of warm acetone. The acetone and ether solutions were combined, dried, concentrated down to a small volume, hot ethanol was added, the solution cooled and the white product filtered off. A crude yield of 26 gms. slightly colored product was obtained. Recrystallization from hot alcohol gave about 21 gms. of a white product, 4-dichloroacetyl-1-(2,6-dimethylphenyl)-piperazine. A small sample crystallized for analysis had a melting point of 96–97° C.

EXAMPLE 4

To a stirred solution of 15 gms. (0.1 mole) of dichloroacetyl chloride dissolved in 300 ml. of dry ether at about 5° C. was added dropwise 32.6 gms. (0.2 mole) of 1-(2-pyridyl)piperazine dissolved in 100 ml. of dry ether. A white product precipitated. After the addition was completed, stirring was continued for about 15 minutes and the product was filtered off and washed with ether. The ether solution (filtrate) was saved. The crude white product was slurried well in water, filtered and washed with water. The 1-(2-pyridyl)piperazine hydrochloride salt is soluble in water, while the desired product is insoluble. This insoluble product was dissolved in ether solution after it was dried in air. The combined ether solutions were dried with anhydrous magnesium sulfate and then concentrated down to about one-third of its volume, cooled in ice water and the white product filtered off. Yield 20.5 gms., melting point 90–91° C. From the mother liquor was obtained about 5 gms. of 4-dichloroacetyl-1-(2-pyridyl)-piperazine, a white product, melting point 88–90° C. A sample of the product (melting point 90–91° C.) was crystallized for analysis and gave a melting point of 90–91° C.

EXAMPLE 5

To a stirred solution of 27 gms. of 1-phenylpiperazine dissolved in 400 ml. of dry ether between 5–10° C. was added dropwise 20 gms. of dibromoacetyl chloride dissolved in 100 ml. of dry ether. The addition took about half an hour and a white precipitate came out. Stirring was continued for 15 minutes after the addition was completed. The white insoluble product was filtered off, washed with dry ether and then dried. This product was slurried in water, the water insoluble product was filtered off and dried. Crude yield, 29 gms., melting point 123° C. (not clear). This was crystallized from acetone and gave a yield of 18.5 gms. of white crystalline product, melting point 128–129° C. with evolution of gas. A small sample of the 4-dibromoacetyl-1-phenylpiperazine was crystallized again from acetone for analytical purpose and gave a melting point 128–129° C. with evolution of gas.

This product is soluble in acetone, alcohol, ether, chloroform, but insoluble in petroleum ether (20–40°) and water.

EXAMPLE 6

To a stirred solution of 32.4 gms. of 1-phenylpiperazine dissolved in 500 ml. of dry ether between 0–5° C. was added dropwise 11.3 gms. of chloroacetyl chloride dissolved in 50 ml. of dry ether. A white precipitate came out. After the addition was completed, stirring continued for 15 minutes and the white product was filtered off, washed with dry ether. This crude product was the 1-phenylpiperazine hydrochloride salt. The filtrate (ether solution) was washed with 1% sodium hydroxide solution to get rid of any hydrochloride salt. The ether solution was next concentrated down, cooled and filtered off a white product, washed with cold dry ether. The yield of 4-chloroacetyl-1-phenylpiperazine was 10 gms., melting point 80–81° C. Product is very soluble in acetone, soluble in alcohol, chloroform, insoluble in petroleum ether (20–40°) and water, partly soluble in ether.

EXAMPLE 7

To a solution of 1.9 gms. of 2,6-dimethyl-4-phenylpiperazine dissolved in 25 ml. of dry benzene was added 0.6 gm. of dichloroacetylchloride dissolved in 15 ml. of dry benzene. This was heated on the steam bath for about ten minutes, solution was cooled and a white product distilled off and left a gummy product. This gummy product was slurried in dry acetone solution and a white insoluble product came out. This acetone insoluble portion was also slurried in water, filtered off and dried, gave a melting point of 259–262° C. with decomposition. Crystallization from hot alcohol gave a yield of about 0.3 gm. of 1-dichloroacetyl-2,6-dimethyl-4-phenylpiperazine hydrochloride, melting point 262–264° C., with decomposition.

EXAMPLE 8

To a stirred solution of 1578 gms. of N-phenylpiperazine dissolved in 10 liters of water cooled down between 0–10° C. was added simultaneously dropwise 1578 gms. of dichloroacetyl chloride and 550 gms. of 85% sodium hydroxide dissolved in 1.5 liters of water. The rate of addition was adjusted so that the stirred solution was always slightly alkaline. During the addition of the dichloroacetyl chloride a white precipitate came out. After the addition was completed, stirring was continued for about 15 minutes. The white precipitate was filtered off, washed free of alkali and dried. This crude product was crystallized from 5.5 liters of alcohol and a yield of about 620 gms. of white product, melting point 128–130° C., was obtained. Another crystallization from alcohol gave 4-dichloroacetyl-1-phenylpiperazine having a melting point of 129–130° C.

EXAMPLE 9

Twenty-nine street dogs of various ages, weights and breeds were inoculated orally with 1000 cultured hookworm larvae (Ancylostoma caninum). Five days later these dogs were segregated into three groups of 7 each and 1 group of 8. One group (8–9 kilos) was given 100 mgs. of 4-dichloroacetyl-1-phenylpiperazine mixed manually in 1 lb. of canned dog food daily. One group (7 kilos) was given 200 mgms. daily, and 1 group (6 kilos) was given 300 mgms. daily. The approximate daily doses were therefore 10, 25 and 50 mg. per kg. The remaining eight dogs were fed unmedicated canned dog food. All treatments were administered daily, with the exception of the 6th, 7th, 34th and 35th days.

Fecal specimens were collected from all dogs on three successive days during the 3rd, 4th, 5th and 6th weeks of treatment, and quantitative ova counts were made, using the Stoll dilution technique. This technique is a standard method for measuring the number of hookworm ova per unit weight of feces, and gives a qualitative approximation of the number of adult worms present in the intestine.

In all three treated groups of dogs, the mean number of hookworm ova was reduced markedly as compared with non-treated controls throughout 6 weeks of continuous feeding. Individual variations were more pronounced at the 10 mg. per kg. level, which was considered to be close to the minimum effective dose. At the end of the 6th week, no hookworm ova were found in either the 25 mg. per kg. or 50 mg. per kg. group.

The dogs which consumed all of the medicated food daily exhibited no untoward symptoms which could be attributed to the compound, and accepted the food without hesitation. A summary of the results is contained in Table III.

TABLE III

*Effect of 4-dichloroacetyl-1-phenyl piperazine on experimental hookworm infectons in dogs when administered daily in feed at doses of 10, 25 and 50 mg. per kg.*

| Dog number | Daily dose 4649L, mg./kg. | Hookworm ova per gram of feces, weeks during treatment | | | |
|---|---|---|---|---|---|
| | | 3rd | 4th | 5th | 6th |
| 25 | 10 | 6,200 | 6,700 | 3,800 | 3,500 |
| 53 | 10 | 0 | 100 | 0 | 100 |
| 46 | 10 | 200 | 300 | 0 | 0 |
| 67 | 10 | 0 | 0 | 0 | 0 |
| 61 | 10 | 3,700 | 2,800 | 700 | 600 |
| 52 | 25 | 1,600 | 1,900 | 100 | 0 |
| 50 | 25 | 800 | 900 | 300 | 0 |
| 44 | 25 | 400 | 100 | 100 | 0 |
| 66 | 25 | 1,700 | 300 | 900 | 0 |
| 42 | 50 | 0 | 0 | 0 | 0 |
| 41 | 50 | 0 | 0 | 0 | 0 |
| 60 | 50 | 300 | 0 | 0 | 0 |
| 39 | 50 | 0 | 0 | 0 | 0 |
| 49 | (¹) | 1,000 | 5,100 | 4,800 | 7,100 |
| 45 | | 10,200 | 35,400 | 7,900 | 32,700 |
| 68 | | 5,700 | 7,000 | 4,900 | 14,800 |
| 40 | | 5,200 | 4,100 | 7,900 | 5,900 |
| 63 | | 2,000 | 9,300 | 3,800 | 18,500 |
| 58 | | 6,600 | 16,500 | 26,200 | 21,100 |

¹ Controls.

In using 4-dichloroacetyl-1-phenyl piperazine in dog food, two general methods can be used. Continuous consumption of the medicated food, using dose levels of from 10 to 25 mg. per kg. daily, would remove the majority of hookworms present prior to treatment and would thereafter remove hookworms acquired throughout the period the dog was maintained on food containing this compound. Intermittent treatment would remove hookworms present at the time, and could be repeated at bimonthly or trimonthly intervals. For this type of treatment, a daily dose of 50 mg. per kg. in feed for 5 to 7 days would be desirable.

The physical properties of other types of anthelmintics which are effective against hookworms preclude their incorporation into food for daily consumption. Compounds such as tetrachlorethylene, carbon tetrachloride, toluene and n-butyl chloride are highly volatile and would probably impart an objectionable taste to the food. Compounds such as hexylresorcinol and heptylresorcinal are known to damage mucous membranes upon contact, and would probably not be tolerated in repeated doses. Prolonged administration of any of these substances at levels now recommended for removing hookworms would give rise to dangerous toxic symptoms.

We claim:
1. A compound selected from the group of those having the formula

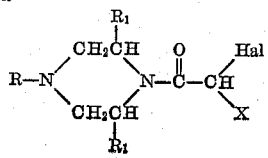

in which R is a member of the group consisting of phenyl, chlorophenyl, diloweralkylphenyl, and pyridyl radicals, $R_1$ is a member of the group consisting of hydrogen and a lower alkyl radical, Hal is a member of the group consisting of chlorine and bromine and X is a member of the group consisting of hydrogen, chlorine and bromine and hydrohalide salts thereof.

2. A compound 4-dichloroacetyl-1-phenyl piperazine.
3. The compound 1 - (4 - chlorophenyl) - 4 - dichloroacetylpiperazine.
4. The compound 4 - dichloroacetyl - 1 - (2 - pyridyl) piperazine.
5. The compound 4 - chloroacetyl - 1 - phenylpiperazine.
6. The compound 4 - dibromoacetyl - 1 - phenylpiperazine.
7. A method of preparing compounds having the formula

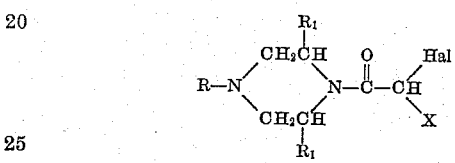

in which R is a member of the group consisting of phenyl, chlorophenyl, diloweralkylphenyl, and pyridyl radicals, $R_1$ is a member of the group consisting of hydrogen and a lower alkyl radical, Hal is a member of the group consisting of chlorine and bromine and X is a member of the group consisting of hydrogen, chlorine and bromine, which comprises reacting a compound having the formula

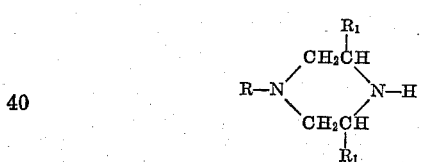

in which R and $R_1$ are as defined above with a dihaloacetyl chloride.

8. A method of preparing 4 - dichloroacetyl-1-phenyl piperazine which comprises reacting 1-phenylpiperazine with dichloroacetyl chloride.
9. A method of preparing 1-(4-chlorophenyl)-4-dichloroacetylpiperazine which comprises reacting 1-(4-chlorophenyl) piperazine with dichloroacetyl chloride in the presence of a solvent.
10. A method of preparing 4-dichloroacetyl-1-(2,6-dimethylphenyl) piperazine which comprises reacting 1-(2,6-dimethylphenyl) piperazine with dichloroacetyl chloride in the presence of a solvent.
11. A method of preparing 4-dichloroacetyl-1-(2-pyridyl) piperazine which comprises reacting 1-(2-pyridyl) piperazine with dichloroacetyl chloride in the presence of a solvent.
12. A method of preparing 4-chloroacetyl-1-phenylpiperazine which comprises reacting 1-phenylpiperazine with chloroacetyl chloride in the presence of a solvent.
13. A method of preparing 4-dibromoacetyl-1-phenylpiperazine which comprises reacting 1-phenylpiperazine with dibromoacetyl chloride in the presence of a solvent.

References Cited in the file of this patent

Kermack et al.: J. Chem. Soc. 1931, 3096–4004.